United States Patent
Kelsall et al.

[11] 3,719,089
[45] March 6, 1973

[54] DETERMINATION OF PARTICLE SIZE DISTRIBUTION

[75] Inventors: Denis Fletcher Kelsall, Beaumaris; Clifford John Restarick, Caulfield, Victoria, both of Australia

[73] Assignee: Commonwealth Scientific and Industrial Research Organization, East Melbourne, Victoria, Australia

[22] Filed: Aug. 11, 1970

[21] Appl. No.: 62,990

[30] Foreign Application Priority Data

Aug. 14, 1969 Australia..............................59519/69

[52] U.S. Cl..................................................73/432 PS
[51] Int. Cl..................................................G01n 15/02
[58] Field of Search.....73/432 PS, 61 R, 194 R, 196; 222/71; 209/72–74

[56] References Cited

UNITED STATES PATENTS

| 3,144,773 | 8/1964 | Bramel | 73/61 X |
| 2,782,926 | 2/1957 | Saxe | 73/432 PS |
| 3,138,029 | 6/1964 | Rich | 73/432 PS |
| 3,334,516 | 8/1967 | Cedrone | 73/61 R |
| 3,478,599 | 11/1969 | Tanaka et al | 73/432 PS |
| 3,494,217 | 2/1970 | Tanaka et al | 73/432 PS |
| 3,519,353 | 7/1970 | Franz et al | 73/432 PS X |

FOREIGN PATENTS OR APPLICATIONS

| 230,503 | 3/1969 | U.S.S.R. | 73/432 PS |

*Primary Examiner*—Louis R. Prince
*Assistant Examiner*—Joseph W. Roskos
*Attorney*—Fleit, Gipple & Jacobson

[57] ABSTRACT

In a method for determining the particle size distribution in a fluid stream wherein the concentration of one size fraction is compared with that of another, the concentration of a given fraction is determined by determining the rate of accumulation of the material of that fraction over a series of successive short time intervals.

6 Claims, 2 Drawing Figures

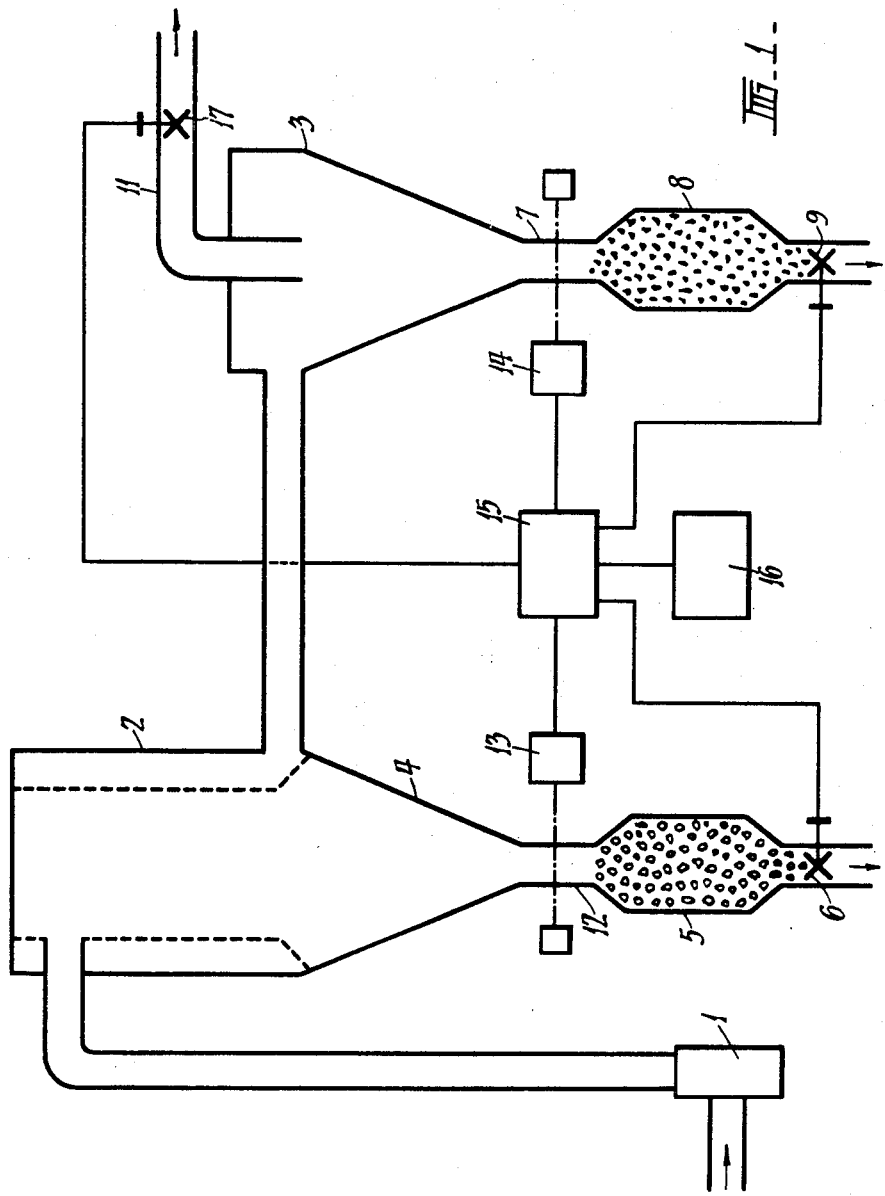

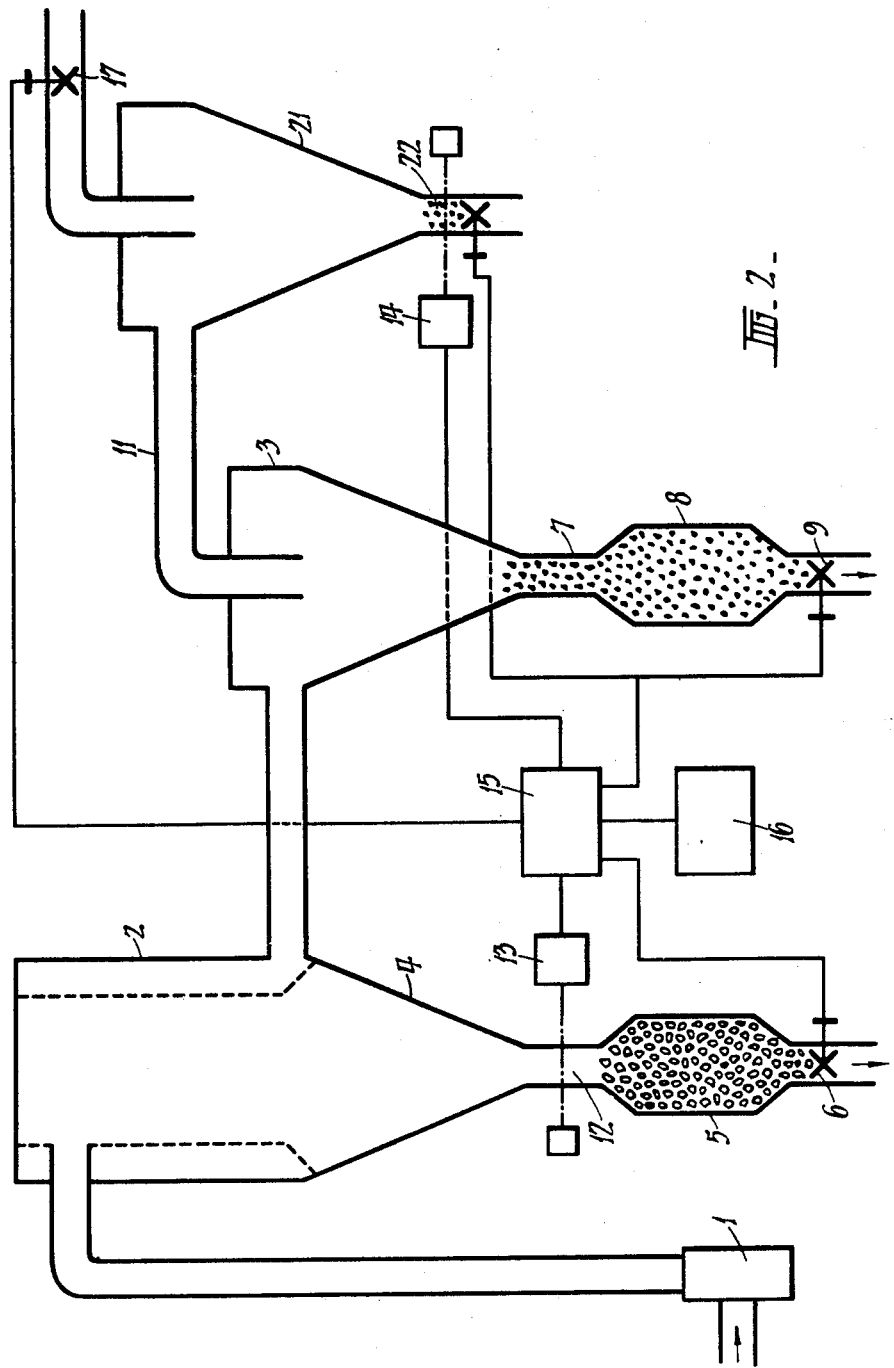

DETERMINATION OF PARTICLE SIZE DISTRIBUTION

This invention relates to the determination of particle size distribution in a stream of particulate material.

There is a need, in for example control of primary metallurgical processes, such as the operation of a ball mill, for a means whereby small but significant changes in the particle size distribution in the product of the mill may be quickly, accurately and if necessary, continuously determined in order to allow accurate and effective control of the operation of the mill. A similar necessity arises in many other processes such as, for example, separation processes. It is particularly desirable that a method be provided whereby small changes of significant duration in the particle size distribution in the stream may be determined irrespective of variations in the flow rate and composition of the stream or of the particle concentration in the stream. At the same time it is desirable to avoid systems which are responsive to instantaneous random fluctuations.

There are several known processes in which attempts have been made to provide continuous on-stream particle size distribution information and it is well known that a measure of the particle size distribution may be obtained by determining the percentage of particles in the stream above or below a certain selected size. It is also known that the distribution can be determined with greater accuracy by taking more than one separation point, for example, by taking two separation points and determining the percentage distribution in an upper size range, an intermediate size range and a lower size range.

One process for on-stream particle size analysis is described in the paper of A.B. Holland-Batt and M.G. Fleming presented to the VII International Mineral Processing Congress in Leningrad 1968 and this process provides for the measurement of particle size distribution by measurement of the beta - ray absorption in the stream. Another method employing x-ray absorption measurement is described in an article entitled "An 'On-stream' x-ray Particle Size Sensor" by K.G. Carr-Brion and P.J. Mitchell in the Journal of Scientific Instruments, 1967, Volume 44 at page 611. Each of these methods requires either that the solids concentration in the stream be kept constant or alternatively that it be continually measured and changes in the concentration allowed for.

Yet another method involving the continuous splitting of a sample stream from the main stream flow is described in an article entitled "Continuous Control of Particle Size" by William Lodding published in Engineering and Mining Journal, Volume 165, No. 7, at page 82. This process involves the screening of the sample stream to provide three flow fractions and the continuous measurement by mass flow meters of the ratio of the fractions. The actual measurement of the flow in each fraction may be measured by any of the known methods such as those discussed above.

A comprehensive review of known methods of on-stream particle size analysis is contained in an article entitled "Particle Size Analysis and Analysers" by C.E. Lapple published in "Chemical Engineering" for May, 1968.

Each of the abovementioned known processes for particle size analysis suffers from certain defects and disadvantages either as to lack of sensitivity to small changes in size distribution, the reproducibility of the results obtained, the expense and complexity of the necessary apparatus, or the absence of independence of the measurements obtained from factors such as flow rate, particle composition and particle concentration. There are two further difficulties associated with continuous measurement systems of the type above in their general application to process control. First of all, they are necessarily sophisticated electronically and therefore expensive and secondly, unless even more expensive equipment is provided to provide electronic integration of the measurements, the measurements will reflect transient variations which are of duration too short to significantly effect the operation being controlled.

The principal object of this invention is therefore to provide a relatively simple and inexpensive continuous short term integration method and apparatus for on-stream determination of particle size distribution which is independent of fluctuations in concentration and flow rate, substantially independent of particle composition and readily adaptable to use in operation control.

It is to be understood that where the expression "-size" is used this is not to be understood as referring only to the lineal dimension of a particle such as its diameter, but to include also other parameters affecting the determination of particle size as it is known in the separation art, for example, density and shape. Thus, "size" is to be understood generally as a measure of the settling rate of the particles of equivalent spherical diameter rather than as being necessarily limited to a measure of lineal dimensions.

According to this invention there is provided a method for the determination of the particle size distribution in a stream of particulate material which comprises separating the stream into at least two separate size fractions, measuring the rate of flow of particulate material in at least one of the size fractions by measuring the rate of accumulation of the material of that fraction over a series of successive short time intervals and comparing the flow rate of the said size fraction with the flow rate of the stream or another fraction thereof. Preferably the rates of flow of two size fractions are measured and their ratios compared. More particularly it is preferred that the flow be separated to three fractions and the ratio of two of the fractions measured.

The flow rate of the selected fractions is preferably measured by measuring the time required to accumulate a given volume of the fraction. Alternatively, the measurement may be made by measuring the volume of the fraction flowing in a given time.

The invention further provides apparatus for determining the particle size distribution comprising means to continuously split the sample stream into at least two separate size fractions, means to successively accumulate and discharge the solids flowing in at least one of the fractions over a series of successive short time intervals to determine the rate of flow of material of the said size fraction and means to compare the said flow rate with the flow rate of the stream or another fraction thereof.

Preferably, there is also provided means to accumulate the solids flowing the other size fraction over a similar series of time intervals and means to compare the rate of accumulation of solids of the two fractions.

Preferably, there are two separators operated to provide three separate fractions and the rate of accumulation of the solids from two of them is measured and compared.

The invention will be more fully described by way of example with reference to the accompanying drawings which illustrate one form which apparatus according to the invention may take and a modification thereof.

FIG. 1 shows diagrammatically an experimental set-up for the separation of a sample stream into three fractions — a coarse fraction, a fine fraction and an ultra fine fraction.

FIG. 2 shows a modification of the apparatus for use where a particularly fine fraction is to be measured.

In the set-up shown in FIG. 1, a slurry of discrete particles in water is fed by pump 1 to a centrifugal screen separator 2 which separates the coarse fraction from the stream. The fine fraction is discharged from the screen separator 2 to a cyclone elutriator 3 where a further separation takes place.

The coarse particles separated out from the centrifugal screen separator 2 pass down via a conical extension in the form of a funnel 4 to an accumulation chamber 5, the accumulation chamber 5 being provided at its lower end with an outlet valve 6. Similarly, the coarser fraction of the fines fed to the elutriator 3 are discharged via the under-flow orifice 7 of the elutriator to an accumulation chamber 8, which has at its lower end a discharge valve 9. The ultra fine particles are discharged to waste via vortex finder discharge 11 through valve 17.

At the neck 12 of the funnel 4 of the screen separator 2 and at the underflow orifice 7 of the elutriator 3 a sensing device is provided, the function of which is to sense the filling up of the accumulation chambers 5 and 8 respectively. These sensing devices 13, 14, are coupled to operate the valves 6 and 9 so that when the sensing devices sense that both the chambers are filled their valves are caused to open and discharge the contents.

As well as operating the valves 6 and 9, the sensers are also made to operate a timing mechanism 15 which determines the time taken for the filling of the respective accumulation chambers. The ratio of the times required for filling of each chamber is a measure of the ratio of coarse to fine particles. It accordingly provides a measure of the particle size distribution within the stream over the period taken for the filling of the chambers. The timing device may be coupled to a simple recording mechanism 16 to provide a visual or other indication of the measurements made.

The sensing device itself may comprise any one of a number of suitable means such as a photoelectric detector, an infra red detector, or even a mechanical sensing device may be used. In our present apparatus, however, we employ as the detecting means a radioactive source and a scintillation counter situated on opposite sides of the neck 12 (in the case of the separator 2) and the orifice 7 (in the case of the elutriator 3).

In a typical cycle set to determine for example, changes in the particle size distribution in a stream where it is desired to maintain the ratio of coarse particles (i.e. those above a predetermined size) to fine particles at 80% plus or minus 2% the apparatus is adjusted so that the fine accumulation chamber 8 fills first (under normal operation). A sample is drawn off from the stream and fed to the apparatus through the pump 1. The valves 6 and 9 will be open and at the start of the determination these valves will close and operate the timing mechanism 15. Solids will then commence to accumulate in the chambers 5 and 8. When the chamber 8 is filled to the level to operate the sensor 7 the time is recorded and later, when the solids in the chamber 5 reach the level determinable by the sensor 13, that time is also recorded. At this stage valve 17 in the vortex finder discharge 11 is closed and valve 9 is opened to discharge the solids from the chamber 8. The valve 6 is next opened and the valve 9 closed to discharge the solids from the chamber 5 and the apparatus is again ready to commence a determination operation. Valve 17 is then opened and the measurement proceeds as before.

From the measurements obtained by the sensers 13 and 14 the timing apparatus obtains a measure of the ratio of the times for filling the chambers 5 and 8 and from this a determination of the size distribution in the sample.

The sensitivity and reproducibility of the operation of the apparatus and its independence of feed rate is demonstrated by the results of tests set out in the table below. In these tests a series of demonstrations were made using samples of known constant size distribution fed during determinations 1 to 5 at a constant feed rate of 100 g/min and during determinations 6 to 12 of 130 g/min. During determination 5 a pulse of an extra 40 gms of the feed material was added; during determination 11 a pulse of 20 gms of feed material was added, and during determination 12 a pulse of 20 gms of the coarse fraction was added.

| No. | Feed rate, g./min. avg. | Coarse time (secs.) | Fine time (secs.) | Total time | Fract. fine | Fract. coarse | Time ratio | Add |
|---|---|---|---|---|---|---|---|---|
| 1 | 100 | 396 | 333 | 728 | .544 | .456 | .84 | |
| 2 | 100 | 406 | 343 | 749 | .542 | .458 | .84 | |
| 3 | 100 | 424 | 355 | 799 | .544 | .456 | .84 | |
| 4 | 100 | 421 | 357 | 779 | .541 | .459 | .85 | |
| 5 | 100 | 403 | 336 | 739 | .545 | .455 | .84 | 40 g. feed. |
| 6 | 130 | 316 | 265 | 581 | .545 | .455 | .84 | |
| 7 | 130 | 323 | 273 | 596 | .542 | .458 | .85 | |
| 8 | 130 | 322 | 272 | 594 | .542 | .458 | .85 | |
| 9 | 130 | 315 | 268 | 583 | .541 | .459 | .85 | |
| 10 | 130 | 320 | 270 | 590 | .544 | .456 | .84 | |
| 11 | 130 | 311 | 260 | 571 | .545 | .455 | .84 | 20 g. feed. |
| 12 | 130 | 302 | 269 | 571 | .530 | .470 | .89 | 20 g. coarse. |

Examination of the above table and in particular reference to the time ratio which is the measure of the size distribution shows that this ratio remains substantially constant irrespective of the feed rate and as unaffected by sudden pulses of feed material. On the other hand a pulse of the coarse material is reflected immediately in a substantial change in the ratio (see determination No. 12).

In a simplification of the apparatus shown in the drawings both the chambers are set to fill at the same time when the stream is in control. Only one time is taken, that of the first chamber to fill and an indication is provided of which chamber has filled first. This provides a measure of whether the distribution in the stream is coarser or finer than the proper distribution.

A modification of the apparatus is shown in FIG. 2. In this modification a further cyclone separation is employed. We have found that where the solids are particularly fine it is difficult to determine accurately the filling time for the chamber 8. There is a tendency for surging of the particles in the stream in the cyclone 3 and the container 8 through the neck 7 and this can lead to premature triggering of the detector 14. To overcome this difficulty we have provided a further cyclone separator 21 to receive the vortex finder discharge from the cyclone 3 and this cyclone is designed to provide the same cut off as the cyclone 3. The sensing device 14, is now made to operate on the under-flow 22 of the cyclone 21.

As the solids concentration of the coarser fraction builds up in the container 8 a stage will be reached at which some of the solids of that fraction will be forced into the vortex finder discharge. We have found that the concentration at which this is reached is constant and accordingly highly reproducible results are obtained if the occurrence of this discharge of coarse particle to the cyclone 21 is used as a means to detect the attainment of the desired accumulation of solids in the cyclone 3 and container 8. Thus, we set the detector 14 to trigger immediately solids are detected as reporting to the under-flow discharge of the cyclone 21.

The apparatus as described above is to be understood merely as an example of the carrying out of this invention and that variations may be made to the apparatus within the spirit and scope of the invention. It will be apparent for example that the type of sensing mechanism used may be varied and it will also be apparent that the form of the actual separating apparatus may be different from that shown in the drawings. Screens for example may be used to affect either or both of the separations or elutriators may be used for both separations. It will also be appreciated that the number of separation stages may be varied depending upon the degree of definition of the determination required.

We claim:

1. A method for the determination of the particle size distribution in a stream of particulate material which comprises separating the stream into at least two separate size fractions, measuring the rate of flow of particulate material in at least one of the size fractions by measuring the time taken to accumulate a known volume of the said particulate material of that fraction over a series of successive short time intervals and comparing the flow rate of the said size fraction with the flow rate of the stream or another fraction thereof.

2. The method of claim 1, wherein the rates of accumulation of the material of at least two size fractions is measured and each of the fractions to be measured are accumulated in chambers of the same volume.

3. A method for the determination of the particle size distribution in a stream of particulate material which comprises separating the stream into at least two separate size fractions, measuring the rate of flow of particulate material in at least one of the size fractions by determining the time taken to reach a given concentration of said particulate material of that fraction in a known volume over a series of successive short time intervals and comparing the flow rate of the said size fraction with the flow rate of the stream or another fraction thereof.

4. A method for the determination of the particle size distribution in a stream of particulate material which comprises separating the stream into at least two separate size fractions, measuring the rate of flow of particulate material in at least one of the size fractions by determining the weight of said particulate material of that fraction accumulated in a known time over a series of successive short time intervals and comparing the flow rate of the said size fraction with the flow rate of the stream or another fraction thereof.

5. Apparatus for determining the particle size distribution in a stream of particulate material comprising a separator to separate out a size fraction, accumulating means to accumulate solids separated out by one of said separators, means to detect the accumulation of a predetermined volume of solids in said accumulating means, means to measure the time taken to accumulate the said predetermined volume and means to compare the times taken for such accumulation over a series of successive accumulations of the said known volume.

6. Apparatus for determining the particle size distribution in a stream of particulate material comprising a first separator to separate out a first size fraction, a second separator to separate out a second size fraction, first accumulating means to accumulate solids separated out by the first separator, second accumulating means to accumulate the solids separated out by the second separator, means to detect the accumulation of a predetermined volume or concentration of solids in each accumulating means, means to measure the time taken to accumulate the said predetermined volume of each fraction and means to compare the times taken for such accumulations over a series of successive accumulations of the said known volumes.

* * * * *